March 7, 1967  R. FERRI  3,307,643
APPARATUS FOR THE REMOVAL OF TREE STUMPS
Filed June 24, 1963  2 Sheets-Sheet 1

INVENTOR
ROMOLO FERRI
BY Richards & Geier
ATTORNEYS

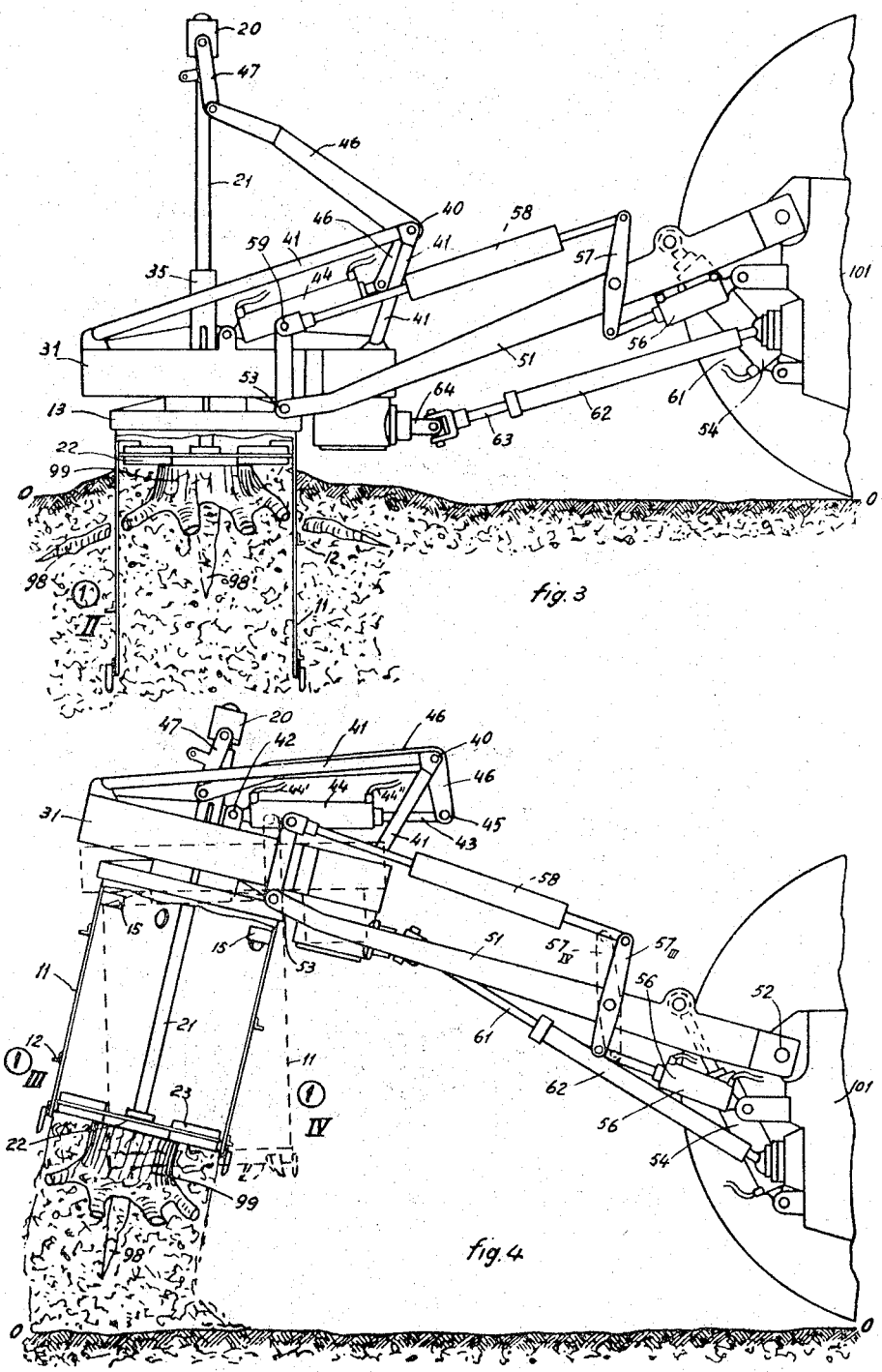

United States Patent Office 3,307,643
Patented Mar. 7, 1967

3,307,643
APPARATUS FOR THE REMOVAL
OF TREE STUMPS
Romolo Ferri, Via Frassine 6, Villa Poma, Italy
Filed June 24, 1963, Ser. No. 289,831
Claims priority, application Italy, Apr. 10, 1963,
8,059/63
5 Claims. (Cl. 175—161)

This invention relates to an apparatus for the removal of tree stumps and refers more particularly to an apparatus which cuts off the roots of a stump of a felled tree and then removes the stumps from the ground.

Certain devices which remove the stumps of previously felled trees are known in prior art. Some of these devices have the shape of jaw-like extractors which grasp a tree stump and pull it out by force. Other devices have the form of levers which penetrate into the ground under the tree stump and then swing so as to raise the stump with all its roots off the ground. These devices require the use of a great deal of force and the exertion of long and complicated labors.

It was also suggested that the roots of a stump should be cut off prior to its removal. However, such suggestions were not followed by an operative device, since heretofore a great deal of a hard manual labor was necessary in order to remove the stumps.

All known prior art devices did not function properly and were of limited utility, since they required exceptionally great forces for effective use.

An object of the present invention is the provision of an apparatus which will eliminate the drawbacks of prior art devices.

Another object is the provision of an apparatus which will easily and effectively cut off the roots of a tree stump, will separate the stump from the surrounding earth and will then lift the stump off the ground with the least possible expenditure of energy.

Other objects of the present invention will become apparent in the course of the following specification.

In accomplishing the objects of the present invention it was found desirable to provide an apparatus having a cylindrical device for cutting off the roots of a tree stump and separating it from the surrounding earth, means operating this device so as to enable it to easily penetrate into the earth, means raising and lowering the device and means expelling a raised tree stump from the apparatus.

The invention will appear more clearly from the following detailed description when taken in connection with the accompanying drawings showing, by way of example only, a preferred embodiment of the inventive idea.

In the drawings:

FIGURE 3 is similar to FIG. 1, but shows the apparatus in a position in which the operations of cutting off the roots and isolating the stump of a tree from the surrounding ground have been completed.

FIGURE 4 is similar to FIGS. 1 and 3, but shows in full lines the apparatus in a position in which it has raised the stump of a tree from the ground and is ready to discharge it; broken lines show the apparatus in its inoperative position in which it is ready to be transported.

Figures 1, 2:
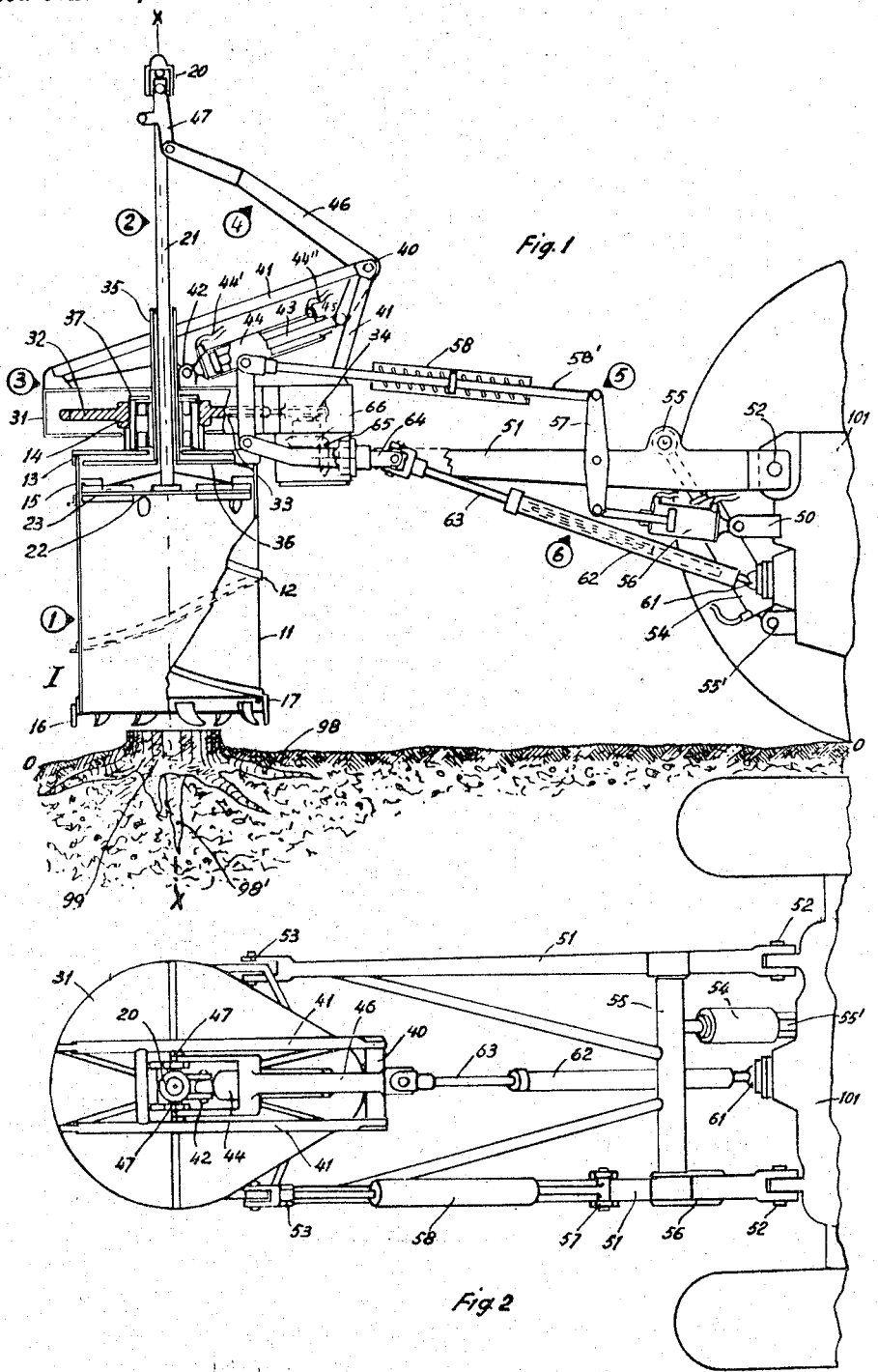
FIGURE 1 is partly a side view of and partly a section through an apparatus constructed in accordance with the present invention, the roots-cutting device of which is in a position in which it is ready to commence its operations.
FIGURE 2 is a top view of the apparatus shown in FIG. 1.

The apparatus shown in the drawings comprises six interconnected devices, namely, a device 1 for cutting off the roots and isolating a tree stump, a device 2 for expelling the tree stump, a device 3 for supporting and actuating the device 1, a device 4 for actuating the device 2, a suspension device 5 for raising and lowering the operative parts of the apparatus and a motion-transmitting device 6 connected with the transporting vehicle 101.

Throughout the following specification parts belonging to the different devices have been designated by the same numeral.

The roots-cutting device 1 includes a cylindrical sleeve 11 adapted to rotate about its central axis x—x. The outer surfaces of the sleeve 11 carry helically disposed ribs 12 which facilitate the penetration of the sleeve into the ground. The top of the sleeve 11 is firmly connected with a cover 13 which carries an upwardly extending tube 14. Projections or stops 15 are carried by the inner walls of the sleeve 11 close to the top thereof. The lower edge 17 of the sleeve 11 carries root-cutting knives or blades 16.

The stump-expelling device 2 operates within the sleeve 11 and includes a plate 22 carrying radial blades 23 which project above and below the plate. When the plate 22 is in its uppermost retracted position, the blades 23 extend adjacent the stops 15. The plate 22 is carried by the lower end of a stem 21 upon the upper end of which is located a pivot-carrying cap 20.

The device 3 includes a chainwheel 32 enclosed in a casing 31 and actuated by an endless chain 33. The chain 33 is driven by a toothed pinion 34. A tube 35 encloses a portion of the stem 21 and is firmly connected with a plate 36 located close to and below the cover 13. The tube 35 is firmly connected to the casing 31. Bearings 37 or the like are located between the tube 14 and the tube 35. The wheel 32 is mounted upon the tube 14, so that its rotation will be transmitted to the sleeve 11 which will rotate about its central axis x—x.

The casing 31 carries two inclined supporting rods 41 constituting a part of the device 4 and carrying a pin 40. A hydraulic or compressed air-actuated device includes a cylinder 44 provided with inlet and outlet passages 44' and 44'', respectively. One end of the cylinder 44 is pivotally connected at 42 to the tube 35. The cylinder 44 contains a piston and a piston rod 43 extending out of the cylinder and connected by a pivot 45 to one arm of a two-armed lever 46 which is swingably mounted intermediate its ends upon the pin 40. The other arm of the lever 46 is bifurcated and is pivotally connected to two links 47. The links 47 are joined by a transverse rod (FIG. 2) and are pivotally connected to the cap 20 located on top of the stem 21. Thus the device 4 is used to actuate the stem 21 of the device 2 while being supported by the device 3.

The casing 31 carries two opposed pivots 53 carrying bifurcated ends of symmetrically disposed arms 51 which constitute a part of the suspension device 5. The opposite ends of the arms 51 are pivoted at 52 to the vehicle 101 which is used to transport the apparatus. The arms 51 are swung by a hydraulic or compressed-air actuated device comprising a cylinder 54 which is carried by a support 55' and which contains a piston and a piston rod attached to a transverse rod 55 which joins the arms 51 (FIG. 2). The support 55' is located close to the motor device 61 of the vehicle which is not illustrated in detail. Yet another hydraulic or compressed-air actuated device is used to swing the sleeve 11 and includes a cylinder 56 which is pivotally connected to a base 50 constituting a part of the body of the vehicle 101. The cylinder 56 contains a piston 56' and a piston rod 56'' which is connected to one of the arms 51 and its upper end is pivoted to a rod 58' which is partly enclosed by a cylinder 58 and the other end of which is connected at 59 to a link 59' which is connected to one of the pivots 53; the cylinder 58 encloses springs 58a pressing against a flange 58b formed in the rod 58' (FIG. 1). The springs 58a tend to maintain the rod 58' in a neutral position shown in FIG. 1.

The device 6 used to transmit motion from the motor drive 61 located close to the edge of the vehicle, includes a telescoping Cardan shaft 62, 63 one end of which is operatively connected to the drive 61, while its other end is connected by means of a universal joint 64' to a small shaft 64 driving a conical gear wheel 65. The conical gear wheel 65 meshes with a gear wheel 66 connected with the pinion 34.

The apparatus is operated as follows:

In the position IV shown by broken lines in FIG. 4 the cutting sleeve 11 is raised high from the ground o—o so that the vehicle 101 can move the apparatus until the sleeve 11 is located directly above the tree stump to be removed, the central axis x—x of the sleeve 11 substantially coinciding with the central axis of the tree stump. Then the operator actuates the hydraulic means 54, thereby moving the rod 55 and lowering the arms 51 connected therewith, so that the expelling device 2 and the actuating device 4 will move downwardly, passing through the position shown in FIG. 1. The sleeve 11 which is connected with the casing 31 engaged by the arms 51, will move to the position I in which the blades 16 are directly above the ground o—o. Due to the lowering of the casing 31 and of the sleeve 11, the stem 21 will be located in its upper position projecting to the greatest possible extent out of the tube 35.

The operator now actuates the drive 61 and this drive is transmitted through the Cardan shaft 62, 63, the shaft 64, the conical gears 65 and 66, the pinion 34 and the chain 33 to the wheel 32. The rotation of the wheel 32 is transmitted through the tube 14 and the cover 13 to the sleeve 11 which will rotate about its central axis x—x. At the same time the sleeve 11 is lowered by the expelling device 2.

The downward movement of the sleeve 11 will continue and the sleeve will gradually penetrate into the earth around the tree stump 99; this movement into the earth is greatly facilitated by the helical ribs 12. The knives will cut off the surrounding roots 98 at the same time. Finally the sleeve 11 will penetrate into the earth to its entire depth, moving from the position I shown in FIG. 1 to the position II shown in FIG. 3. The blades 23 carried by the plate 22 will engage the tree stump 99 and they will engage the stops 15 of the rotating sleeve 11. Thus eventually the tree stump 99 will begin to rotate along with the sleeve 11. The tree stump 99 may have a downwardly extending root 98' which will provide resistance to the rotary movement of the stump. However, downward pressure and rotation of the sleeve 11 will eventually overcome such resistance and then the stump 99 with the earth which surrounds it will rotate as a single unit with the sleeve 11.

In order to remove the tree stump 99 from the earth, the operator reverses the direction of fluid in the hydraulic or compressed air means 54, thereby raising the arms 51 and the parts carried by them until the sleeve 11 assumes the position III shown in FIG. 4.

In order to eject the tree stump 99 and the surrounding earth from the sleeve 11, the operator actuates the hydraulic device 56 which operates the link 57 and swings the sleeve 11 to the position IV of FIG. 4. When the hydraulic device 44 is actuated, it will swing the link 46 to move downwardly the stem 21 along with the plate 22, thus pushing the stump 99 and the earth out of the sleeve 11.

It is apparent that the example shown above has been given solely by way of illustration and not by way of limitation and that it is subject to many variations and modifications within the scope of the present invention. All such variations and modifications are to be included within the scope of the present invention.

Throughout the specification and claims the term "hydraulic means" is used to include a device which is operated by compressed air, as well as one which is operated by a liquid.

What is claimed is:

1. An apparatus for the removal of tree stumps, comprising, in combination, rotary means having circumferentially disposed cutters for cutting off the roots of a stump of a felled tree and for separating said stump from adjacent ground, means connected with the first-mentioned means for rotating the first-mentioned means, means connected with the first-mentioned means for swinging the first-mentioned means relatively to the stump being cut, means connected with the first-mentioned means for expelling the separated stump from the space enclosed by said cutters, means connected with the fourth-mentioned means and the second-mentioned means for actuating the fourth-mentioned means, and means connected with the first and fourth-mentioned means for swinging the first and fourth-mentioned means in vertical planes relatively to the ground.

2. An apparatus in accordance with claim 1, wherein the last-mentioned means comprise a rod connected with the first- and fourth-mentioned means and having a flange, and springs engaging opposite sides of said flange.

3. An apparatus for the removal of tree stumps, comprising, in combination with a vehicle and means driving the vehicle, a rotary sleeve, means carried by said sleeve for cutting off the roots of a stump of a felled tree and for separating said stump from adjacent ground, means connected with said sleeve and said driving means for rotating the sleeve, means connected with the last-mentioned means and said sleeve for swinging said sleeve in vertical planes relatively to the ground, a plate within said sleeve, means connected with said plate and the last-mentioned means for moving said plate within said sleeve to expel a stump from said sleeve, means connected with the fourth-mentioned means for actuating the fourth-mentioned means, and means connected with said sleeve, said plate and said vehicle driving means for swinging the sleeve and the plate in vertical planes relatively to the ground.

4. An apparatus for the removal of tree stumps, comprising, in combination with a vehicle and means driving the vehicle, a rotary sleeve, means carried by said sleeve for cutting off the roots of a stump of a felled tree and for separating said stump from adjacent ground, means connected with said sleeve and said driving means for rotating the sleeve, means connected with the last-mentioned means and said sleeve for swinging said sleeve in vertical planes relatively to the ground, a plate within said sleeve, stump-engaging blades carried by said plate, a stem having an end firmly connected with said plate, hydraulically operated means connected with said stem for moving said plate within said sleeve, and hydraulically operated means carried by said vehicle and connected with said sleeve for swinging the sleeve along with the first-mentioned hydraulically operated means in vertical planes relatively to the ground.

5. An apparatus in accordance with claim 4, comprising stops carried by an inner surface of said sleeve and engaged by said stump-engaging blades in a retracted position of said plate.

References Cited by the Examiner

UNITED STATES PATENTS

| | | | |
|---|---|---|---|
| 370,810 | 10/1887 | Newman | 175—313 X |
| 1,114,505 | 10/1914 | Moore. | |
| 2,557,637 | 6/1951 | Danvser | 173—38 |
| 2,581,535 | 1/1952 | Jackson | 173—26 X |
| 2,775,428 | 12/1956 | Monthan | 37—2 |

CHARLES E. O'CONNELL, Primary Examiner.

BENJAMIN BENDETT, Examiner.

W. J. MALONEY, R. E. FAVREAU,
Assistant Examiners.